United States Patent
Sakakima et al.

(10) Patent No.: US 6,686,071 B2
(45) Date of Patent: Feb. 3, 2004

(54) MAGNETIC RECORDING MEDIUM AND MAGNETIC RECORDING APPARATUS USING THE SAME

(75) Inventors: Hiroshi Sakakima, Kyoto (JP); Hideaki Adachi, Osaka (JP); Mitsuo Satomi, Osaka (JP); Yasuhiro Kawawake, Kyoto (JP); Yasunari Sugita, Osaka (JP); Kenji Iijima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/873,753

(22) Filed: Jun. 4, 2001

(65) Prior Publication Data

US 2002/0045070 A1 Apr. 18, 2002

(30) Foreign Application Priority Data

Jun. 6, 2000 (JP) ........................................ 2000-168548

(51) Int. Cl.$^7$ .............................. G11B 5/66; G11B 5/70; H01J 1/00
(52) U.S. Cl. ......................... 428/694 TS; 428/694 TM; 428/900; 428/611
(58) Field of Search ....................... 428/694 T, 694 TS, 428/694 TM, 900, 611; 360/97.01

(56) References Cited

U.S. PATENT DOCUMENTS

| | | | |
|---|---|---|---|
| 4,985,273 A | 1/1991 | Mino | 427/35 |
| 5,529,814 A | 6/1996 | Tan et al. | 427/547 |
| 5,843,589 A | 12/1998 | Hoshiya et al. | 428/692 |
| 5,882,436 A * | 3/1999 | Bernardi et al. | 148/100 |
| 6,280,813 B1 * | 8/2001 | Carey et al. | 428/65.3 |
| 6,307,708 B1 | 10/2001 | Yoda et al. | 360/126 |
| 6,534,203 B2 | 3/2003 | Iwasaki et al. | 428/694 T |
| 2001/0051288 A1 * | 12/2001 | Iwasaki et al. | 428/694 TM |

FOREIGN PATENT DOCUMENTS

| | | |
|---|---|---|
| EP | 0 871 231 | 10/1998 |
| EP | 0 917 161 | 5/1999 |
| EP | 0 930 624 | 7/1999 |
| JP | 1-309902 | 12/1989 |
| JP | 10-284768 | 10/1998 |
| JP | 11-296832 | 10/1999 |

OTHER PUBLICATIONS

Nov. 30, 2001 EPO Search Report.
Abarra et al., *Digest of Intermog 2000*, AA–06, "Longitudinal Magnetic Recording Media with Thermal Stabilization".
Sakakima et al., IEEE Transactions on Magnetics, 35:2958–2960, "Spinvalves using Perovskite Antiferromagnets as the Pinning Layers".
Sun et al., *Science*, 287:1989–1992, "Monodisperse FePt Nanoparticles and Ferromagnetic FePt Nanocrystal Superlattices".

* cited by examiner

*Primary Examiner*—Holly Rickman
(74) *Attorney, Agent, or Firm*—Merchant & Gould P.C.

(57) ABSTRACT

A magnetic recording medium includes a magnetic film for signal recording and a film containing $M_2O_y$ as a main component that is magnetically exchange-coupled to the magnetic film to increase the effective V and Ku of the magnetic film and to suppress thermal fluctuation. Herein, M is at least one element selected from Fe, Co, Ni, alkaline earth elements, Y, lanthanoids and Bi and includes at least one selected from Fe, Co and Ni as an essential element, and y is a value satisfying $2.8 < y < 3.2$.

10 Claims, 4 Drawing Sheets

MAGNETIC RECORDING MEDIUM AND MAGNETIC RECORDING APPARATUS USING THE SAME

BACKGROUND OF THE INVENTION

1. Field of the Invention

The present invention relates to a magnetic recording medium and a magnetic recording apparatus using the same. In particular, the present invention relates to a magnetic recording medium in which thermal fluctuation is suppressed.

2. Description of the Prior Art

In recent years, the recording density of HDDs (hard disk drives) has increased significantly, and recording bits recorded in a magnetic recording medium become increasingly smaller year after year. With this trend, the magnetic grain size of the recording medium becomes smaller, which causes the problem of thermal fluctuation. A criterion for determining the stability against thermal fluctuation is $KuV/k_BT$, where Ku is the magnetic anisotropic energy of a magnetic medium, V is the volume of a magnetic grain, $k_B$ is the Boltzmann's constant, and T is the absolute temperature. HDDs having larger $KuV/k_BT$ are more stable against thermal fluctuation. In order to solve this problem, there are two approaches: increasing Ku and increasing V by using a perpendicularly magnetized medium to increase the thickness of the film. Another attempt to improve thermal fluctuation is made by increasing the effective volume V by combining a recording medium and an antiferromagnetic film made of an oxide, NiO or an alloy such as NiMn, RhMn, CrMnPt or the like as used for spin-valve magnetic heads (JP 11(1999)-296832A).

However, when Ku is increased, the coercive force of the recording medium is increased, which makes recording by a magnetic head difficult. In order to solve this problem, it is necessary to develop a soft magnetic film having a high saturation magnetization, but there are no soft magnetic films having a 2.5 T or more at present, so that this approach will lose its effectiveness sooner or later. On the other hand, the approach of using a perpendicular magnetic recording medium theoretically can be excellent. However, in practice, there are problems such as medium noise and delayed development of magnetic heads suitable for a perpendicular recording medium. Therefore, a magnetic recording medium that has more excellent characteristics than those of a conventional inplane medium is not available yet.

Furthermore, when an antiferromagnetic film made of an oxide, NiO or the above-mentioned alloys is exchange-coupled to a recording medium, the magnetization curve of the recording medium becomes asymmetric because of the unidirectional anisotropy of the antiferromagnetic materials. When the magnetization curve of the recording medium is asymmetric, the medium is magnetized easily by an external magnetic field from one direction, whereas the medium is not magnetized easily by an external magnetic field from the other direction, and thus the stability against thermal fluctuation of a recording medium depends on the direction from which the recording medium is magnetized.

SUMMARY OF THE INVENTION

Therefore, with the foregoing in mind, it is an object of the present invention to provide a novel magnetic recording medium in which thermal fluctuation is suppressed and a magnetic recording apparatus using the same.

A magnetic recording medium of the present invention includes a magnetic film for signal recording; and a film containing $M_2O_y$ as a main component that is magnetically exchange-coupled to the magnetic film, in order to increase the effective V and Ku of the magnetic film and thus suppress thermal fluctuation.

Herein, M is at least one element selected from Fe, Co, Ni, alkaline earth elements, Y, lanthanoids, and Bi and includes at least one selected from Fe, Co and Ni as an essential element (in other words, M is an element including at least one selected from Fe, Co and Ni, and may further include at least one element selected from alkaline earth elements, Y, lanthanoids, and Bi), and y is a value satisfying $2.8 < y < 3.2$. In this specification, "main component" refers to a component making up 50 wt % or more.

Furthermore, a magnetic recording apparatus of the present invention includes the above-described magnetic recording medium and a magnetic head for recording information on the medium.

As described above, according to the present invention, a magnetic recording medium that is stable against thermal fluctuation even if micro signal recording is performed, and a high density magnetic recording apparatus using the same can be provided.

These and other advantages of the present invention will become apparent to those skilled in the art upon reading and understanding the following detailed description with reference to the accompanying figures.

DETAILED DESCRIPTION OF THE INVENTION

Hereinafter, preferable embodiments of the present invention will be described with reference to the accompanying drawings.

Figure 1:
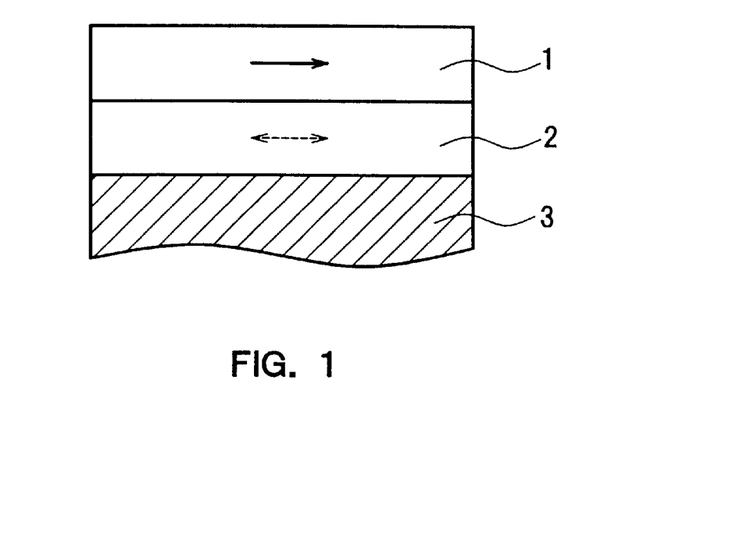
FIG. 1 is a cross-sectional view showing an embodiment of a magnetic recording medium of the present invention.

In the magnetic recording medium shown in FIG. 1, a magnetic film (first magnetic film) 1 for signal recording is magnetically exchange-coupled to a film 2 containing $M_2O_y$ as the main component, the films being formed over a substrate 3.

When the film 2 containing $M_2O_y$ as the main component is provided, the absolute value of a shift magnetic field s that is defined by Equation 1 below can be restricted to 200 Oe or less, preferably 100 Oe or less.

$$s = (H_1 + H_2)/2 \qquad \text{Equation 1}$$

where $H_1$ and $H_2$ are magnetic fields in which the magnetization is 0 (M=0) in the magnetization—magnetic field curve (M—H curve; hereinafter simply referred to as "magnetization curve") showing the relationship between the magnetic field (H) and the magnetization (M).

Herein, the shift magnetic field is an indicator showing a shift amount in the magnetization curve.

The film containing $M_2O_y$ as the main component is macroscopically substantially non-magnetic. In general, this film exhibits antiferromagnetic properties, and therefore the film is macroscopically non-magnetic, even if it is microscopically magnetic. However, this film is significantly different from a regular antiferromagnetic material such as an oxide, NiO or an alloy such as TM(TM=Ni, Pt, Ir, Fe, Pd, Rh, Ru, Cr)—Mn based alloy as used for spin-valve heads of HDDs in the following aspects.

Figure 2:
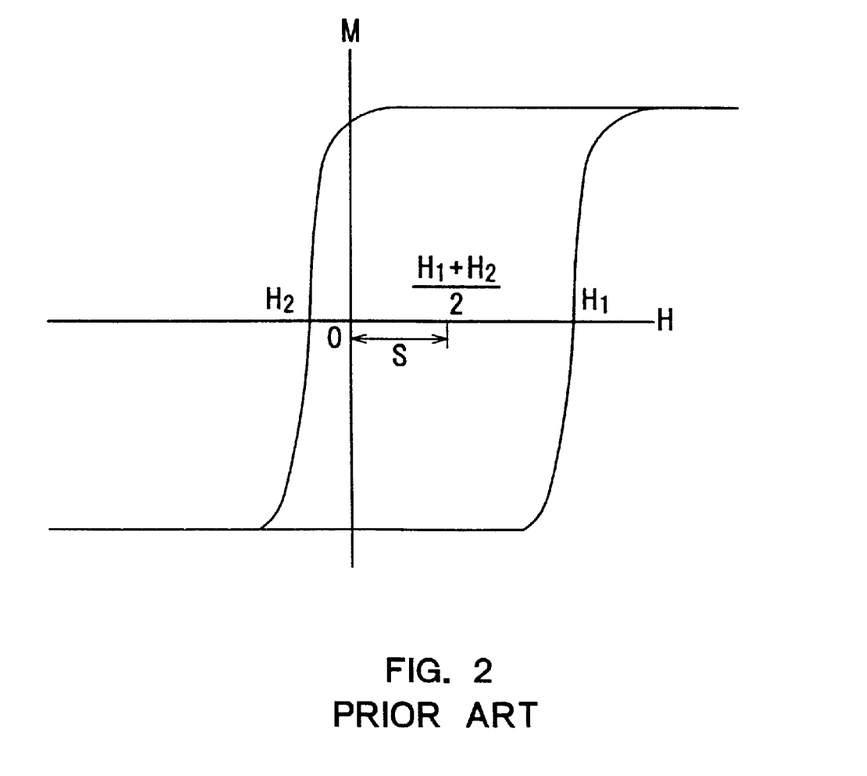
FIG. 2 is a view showing an example of the magnetization curve of a conventional exchange-coupled film.

As shown in FIG. 2, in a regular exchange-coupled film where an antiferromagnetic film and a magnetic film are laminated, the magnetization curve is asymmetric where the magnetization curve is shifted in one direction, because of the unidirectional anisotropy of the antiferromagnetic substance. When such a magnetic film having a large shift magnetic field s is used for a recording medium, the film is magnetized easily by an external magnetic field from one direction and is not easily magnetized by an external magnetic field from the other direction. For this reason, the stability against thermal fluctuation is different depending on the direction from which the film is magnetized.

Figure 3:
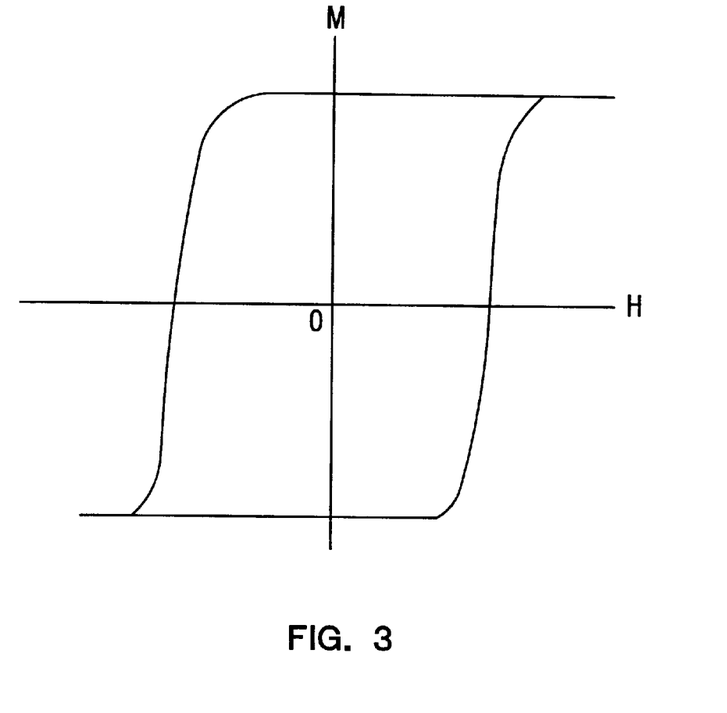
FIG. 3 is a view showing an example of the magnetization curve of a magnetic recording film of the present invention.

On the other hand, as shown in FIG. 3, in an exchange-coupled film where a magnetic film and a film containing $M_2O_y$ as the main component are laminated, the magnetization curve is highly symmetric with respect to a magnetic field H, so that this film is suitable for use in a recording medium.

In general, the shift magnetic field s preferably is 200 Oe or less, but in this present invention, a shift magnetic field s can be 100 Oe or less or even 50 Oe or less.

The magnetization curve shown in FIG. 3 can be obtained by laminating a magnetic film and a hard magnetic film. However, in this case, the thickness of the magnetic layer portion of a recording medium, which is the total of the thicknesses of the magnetic film and the hard magnetic film, is large. Therefore, when the magnetic domain or the magnetic grain size in the inplane direction is reduced, the antiferromagnetic field is increased. Therefore, self-demagnetization occurs, which makes it difficult to achieve high intensity recording.

On the other hand, the film containing $M_2O_y$ as the main component is substantially non-magnetic, and therefore, even if this film and a magnetic film are laminated, the thickness of the magnetic layer portion is not increased from the thickness of the magnetic layer, so that the aforementioned problem is not caused. In addition, exchange coupling between the magnetic film and the film containing $M_2O_y$ as the main component increases the effective volume V of the magnetic film and also can provide a magnetic recording medium having a larger Ku while suppressing an increase of the shift magnetic field s. As a whole, a magnetic recording medium that is highly resistant to thermal fluctuation can be obtained.

The element M may include an element A that is at least one selected from alkaline earth elements, Y, lanthanoids, and Bi, and an element B that is Fe, Co and Ni. In this case, $M_2O_y$ can be represented by $(A_{1-x}B_x)_2O_y$ (where 0<x<1).

In $(A_{1-x}B_x)_2O_y$, it is preferable that t defined by Equation 2 below satisfies 0.8<t<0.97.

$$t=(Ra+Ro)/(\sqrt{2}\cdot(Rb+Ro)) \quad \text{Equation 2}$$

where Ra is the ion radius of the element A, Rb is the ion radius of the element B, and Ro is the ion radius of the oxygen ion.

When t is in the above-defined range, the oxide generally is of a perovskite structure.

Preferable examples of the element A are elements having a large ion radius, and in particular, rare earth elements such as Y, La, Pr, and Sm or alkaline earth elements such as Ca and Sr are preferable.

Preferable examples of the element B are transition metals having a relatively small ion radius (Ra>Rb), and in particular, Fe is preferable.

When Fe is used, a layer for suppressing magnetization rotation can be provided that exhibits a pinning effect even at high temperatures. Furthermore, there is no limitation regarding the ratio of the elements A to B, but 0.4<x<0.6 is preferable. The case of x=0.5, that is, $(A_{0.5}B_{0.5}O_y)$ is represented simply by $ABO_y$. Preferable examples of $ABO_y$ include $YFeO_3$, $LaFeO_3$, $PrFeO_3$, $NdFeO_3$, $SmFeO_3$, $GdFeO_3$, $TbFeO_3$, $CaFeO_3$, $SrFeO_3$, and $BiFeO_3$.

As the element A and/or the element B, a plurality of elements can be included. A specific example is $La_{0.9}Sr_{0.1}Fe_{0.9}Ni_{0.1}O_3$. When a plurality of element are included, the ion radius Ra (Rb) of the element A (B) is determined by the weighted average obtained by weighting based on the atomic ratio of the elements.

The element M in $M_2O_y$ can be Fe. As $Fe_2O_y$, $\alpha\text{-}Fe_2O_3$, which is called hematite, is preferable.

The film containing $M_2O_y$ as the main component can be formed at room temperature as the substrate temperature. However, when the film is formed under heating to 300° C. or more, the magnetic film for signal recording can be provided with a larger magnetic anisotropy. The film can be formed by evaporation or the like, but preferably by sputtering. In particular, the film containing $M_2O_y$ as the main component formed by sputtering at an Ar gas pressure of 2 mTorr or less can provide the magnetic film with a larger magnetic anisotropy. The easy magnetization direction can be determined by applying a magnetic field during formation of the film.

A first magnetic film for signal recording becomes a hard magnetic film by exchange coupling to the film containing $M_2O_y$ as the main component. This magnetic film itself preferably is a hard magnetic film, and more specifically, it is preferable that the film has a coercive force of 100 Oe or more. As the first magnetic film, films containing Co, Fe or CoFe as the main component are preferable, and for example, hard magnetic films containing a (Co, Fe, Ni)—(Cr, Pt Ta, B) composition such as CoPt, CoCrPtTa, CoCrPtB, CoNiCrPtTa, FePt as the main component can be used.

Figure 4:
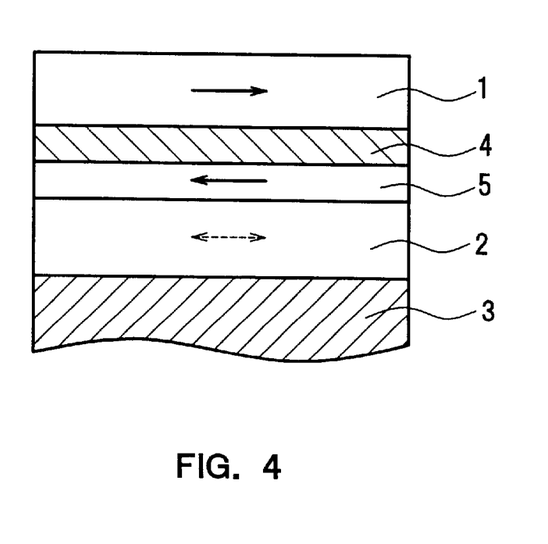
FIG. 4 is a cross-sectional view showing another embodiment of a magnetic recording medium of the present invention.

The structure of the magnetic recording medium of the present invention is not limited to that shown in FIG. 1. For example, as shown in FIG. 4, a magnetic recording medium including a first non-magnetic film 4 and a second magnetic film 5 between the first magnetic film 1 and the film 2 containing $M_2O_y$ as the main component can be used, where the first magnetic film 1 and the second magnetic film 5 are antiferromagnetically exchange-coupled via the first non-magnetic film 4. With this structure, the recording medium as a whole can achieve a larger Ku and increase the effective volume V. In the medium shown in FIG. 4, the film 2 containing $M_2O_y$ as the main component is exchange-coupled directly to the second magnetic film 5 and is exchange-coupled indirectly to the first magnetic film 1 that is antiferromagnetically coupled to the second magnetic film 5.

It is preferable that the product $Ms_1 \cdot d_1$ of the magnetization $Ms_1$ and the thickness $d_1$ of the first magnetic film 1 is larger than the product $Ms_2 \cdot d_2$ of the second magnetic film 5. It is preferable that the product $Ms_1 \cdot d_1$ is sufficiently larger than the product $Ms_2 \cdot d_2$ so as not to weaken reproduction signals of a head because of a reduced leakage magnetic flux from the medium.

In order to effect antiferromagnetic exchange coupling between the first magnetic film 1 and the second magnetic film 5, it is preferable to use a Ru film having a thickness of about 0.6 to 0.9 nm or a Cu film having a thickness of about 0.8 to 1.0 nm as the first non-magnetic film 4.

Figure 5:
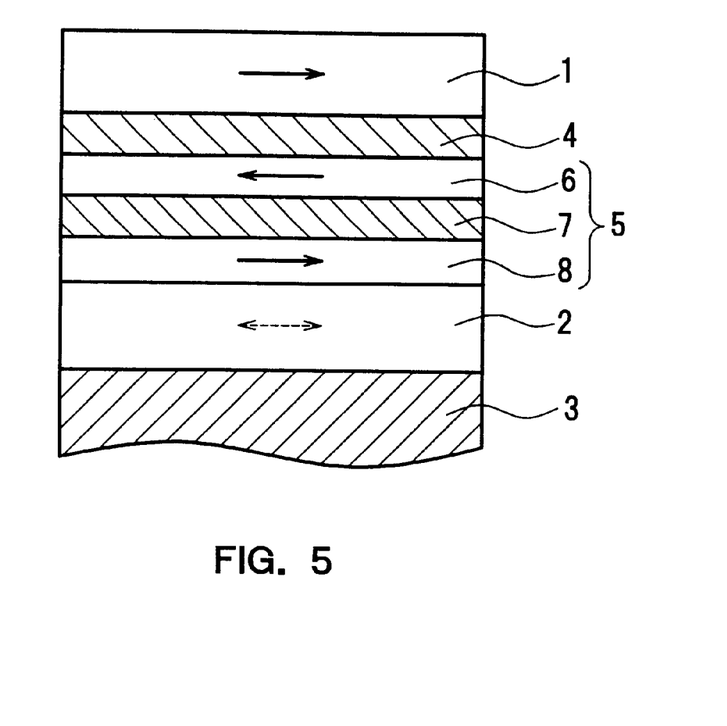
FIG. 5 is a cross-sectional view showing still another embodiment of a magnetic recording medium of the present invention.

Furthermore, a magnetic recording medium as shown in FIG. 5 can be used. This medium uses a laminate including a third magnetic film 6, a second non-magnetic film 7 and a fourth magnetic film 8 in this order as the second magnetic film 5, and the third magnetic film 6 is antiferromagnetically exchange-coupled to the fourth magnetic film 8. With this structure, the recording medium as a whole can achieve an even larger Ku. In the medium shown in FIG. 5, the film containing $M_2O_y$ as the main component is exchange-coupled directly to the fourth magnetic film 8 and is exchange-coupled indirectly to the first magnetic film 1 that is antiferromagnetically coupled to the third and fourth magnetic films 6 and 8.

In the medium shown in FIG. 5, it is most preferable that the product $Ms_3 \cdot d_3$ of the magnetization and the thickness of the third magnetic film 6 is substantially equal to the product $Ms_4 \cdot d_4$ of the fourth magnetic film 8, because there is substantially no reduction of the leakage magnetic field from the first magnetic film 1. Also in this medium, it is preferable to use a Ru film having a thickness of about 0.6 to 0.9 nm or a Cu film having a thickness of about 0.8 to 1.0 nm as the second non-magnetic film 7.

Figure 6:
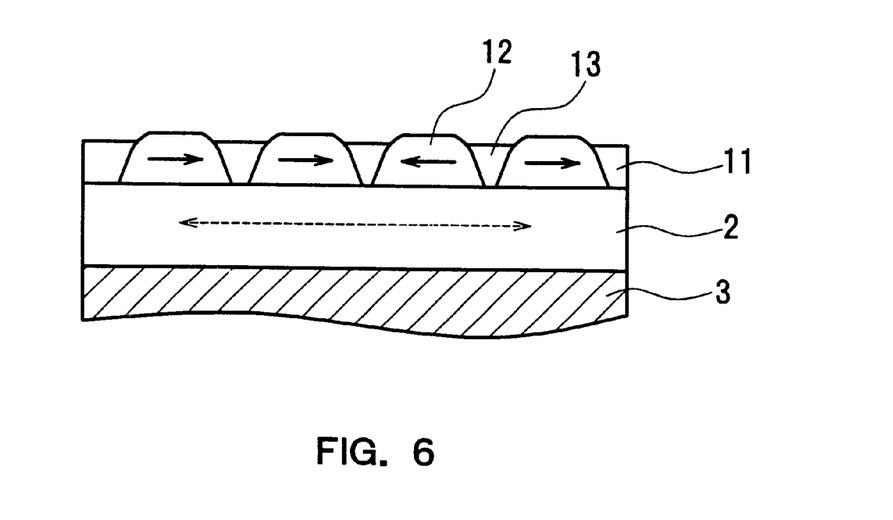
FIG. 6 is a cross-sectional view showing yet another embodiment of a magnetic recording medium of the present invention.

Furthermore, as shown in FIG. 6, in order to achieve super high-density recording, a magnetic film 11 including a plurality of fine magnetic grains 12 having a grain size of 10 nm or less in a non-magnetic matrix 13 can be used as the magnetic film for signal recording.

The magnetic recording medium using fine magnetic dots arranged in such a non-magnetic matrix is expected as a medium that can allow high-density recording. However, when the grain size is 3 nm or less, the medium tends to be superparamagnetic, so that the medium is weak against thermal fluctuation. However, by applying the present invention to effect magnetic exchange coupling to the film containing $M_2O_y$ as the main component, the heat stability can be improved significantly. Furthermore, since the film containing $M_2O_y$ as the main component is an oxide, the stability on the surface or the interface is better than that of a metal film. Therefore, when disposing the film under magnetic dots, the film can be formed as a continuous film, which makes it easy to produce the magnetic recording medium.

The fine magnetic dots dispersed in the non-magnetic matrix can be produced in the following methods: a method of preparing a magnetic target for the magnetic grains and a non-magnetic target for the non-magnetic matrix, and co-sputtering in a vacuum chamber; a method of providing a monomolecular adsorption film on the surface of the magnetic grains and thus chemically bonding them (e.g., JP 1(1989)-309902A); a method of subjecting an organic metal containing a magnetic element to a heat treatment to form self-aligned magnetic dots (e.g., Science Vol. 287 (2000) p.1989); or the like.

As the second, third and fourth magnetic films 2, 3 and 4, a film containing Co as the main component is preferable, but the same film as the first magnetic film also can be used.

Although not shown in the drawings, in the recording medium of the present invention, an addition layer can be formed in the basic structure described above. Examples of additional layers include a protective film that is provided on the surface of the medium or an underlying film that is formed on the substrate.

Figure 7:
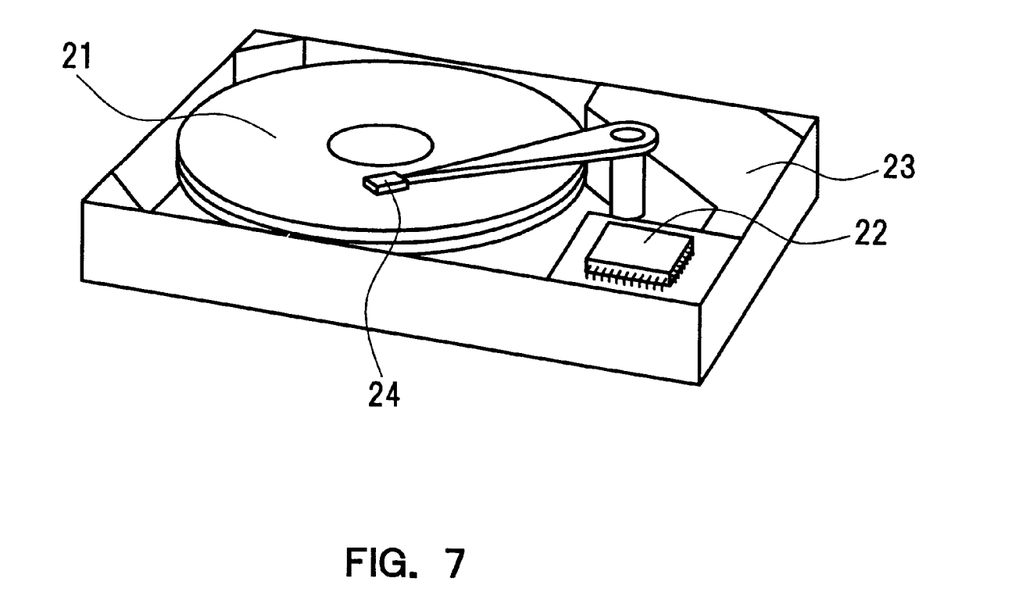
FIG. 7 is a perspective view showing an embodiment of a magnetic recording apparatus of the present invention.

FIG. 7 shows a magnetic recording apparatus using the magnetic recording medium 21 described above and includes a magnetic head 24 for recording signals on the medium 21, a servo portion 23 and a signal processing portion 22. With this apparatus, super high-density recording that cannot be achieved in conventional HDDs can be achieved.

EXAMPLES

Example 1

Magnetic recording media were produced by sputtering with a Co alloy, sintered $ABO_3$ (A=La, Pr, Nd, Sm, Gd, Tb, Y; B=Fe) and sintered $\alpha$-$Fe_2O_3$ as targets. A vacuum chamber was evacuated to $1 \times 10^{-8}$ Torr or less, and then various $ABO_3$ films and a $\alpha$-$Fe_2O_3$ film were formed on Si disk substrates by RF sputtering at an Ar gas pressure of about 0.8 mTorr and a substrate temperature of 300° C. Then, a Co magnetic film was formed by DC sputtering at room temperature as the substrate temperature. Thus, the recording medium having the structure shown in FIG. 1 was produced.

For comparison, a Co single layer film and a PtMn film/Co film were formed by sputtering with a PtMn target and a Co target and at room temperature as the substrate temperature.

The thicknesses of the films were as follows: 50 nm for the $ABO_3$ film and the $\alpha$-$Fe_2O_3$ film; 30 nm for the PtMn film; and 5 nm for the Co magnetic film. A Ta film having a thickness of 5 nm was formed on the surface of each of the produced media as a protective film.

The produced recording media were held at 280° C. for 2 hours while applying a magnetic field of about 5 kOe under a vacuum. Thereafter, the magnetization curve of the recording media was measured at room temperature, and the coercive force Hc and the shift magnetic field s were measured. The results are as follows.

TABLE 1

| No | Medium | Coercive force (Oe) | Shift magnetic field (Oe) |
| --- | --- | --- | --- |
| A | Co | 80 | ~0 |
| B | PtMn/Co | 120 | ~500 |
| 1-1 | LaFeO$_3$/Co | 680 | <20 |
| 1-2 | PrFeO$_3$/Co | 450 | <10 |
| 1-3 | NdFeO$_3$/Co | 420 | <10 |
| 1-4 | SmFeO$_3$/Co | 420 | <10 |
| 1-5 | GdFeO$_3$/Co | 410 | <10 |
| 1-6 | TbFeO$_3$/Co | 410 | <10 |
| 1-7 | YFeO$_3$/Co | 560 | <20 |
| 1-8 | $\alpha$-Fe$_2$O$_3$/Co | 820 | <20 |

As shown in Table 1, in the media 1-1 to 1-8, the coercive force can be increased while restricting the shift magnetic field.

Example 2

Magnetic recording media were produced by sputtering with CoNiCrPtTa alloy and sintered $ABO_3$ (A=La, Pr, Nd, Sm, Gd, Tb, Y, Ca, Bi; B=Fe) as targets. A vacuum chamber was evacuated to $1 \times 10^{-8}$ Torr or less, and then various ABO$_3$ films were formed on Si disk substrates by RF sputtering at an Ar gas pressure of about 0.8 mTorr and a substrate temperature of 600° C. Then, a CoNiCrPtTa magnetic film was formed by DC sputtering at room temperature as the substrate temperature. Thus, the recording medium having the structure shown in FIG. 1 was produced.

For comparison, a CoNiCrPtTa single layer film was formed with a CoNiCrPtTa target.

The thicknesses of the films were as follows: 50 nm for the ABO$_3$ film; and 15 nm for the CoNiCrPtTa magnetic film. A carbon film having a thickness of 5 nm was formed on the surface of each of the produced media as a protective film.

The produced recording media were held at 300° C. for 1 hour while applying a magnetic field of about 5 kOe under a vacuum. Thereafter, the coercive force Hc was measured with a vibrating sample magnetometer at room temperature. Furthermore, signals were recorded on these media with 400 kFCI, using a magnetic head having a recording pole made of Fe$_{0.5}$Ni$_{0.5}$, and immediately after recording, the signals were reproduced with a GMR head. Then, 100 hours later, the same measurement was performed to examine changes in the reproduction output. The results are as follows.

TABLE 2

| No | Medium | Coercive force (Oe) | Change in reproduction output (%) |
|---|---|---|---|
| C | CoNiCrPtTa | 2400 | −15% |
| 2-1 | LaFeO$_3$/CoNiCrPtTa | 3800 | −1% |
| 2-2 | PrFeO$_3$/CoNiCrPtTa | 3300 | −2% |
| 2-3 | NdFeO$_3$/CoNiCrPtTa | 3000 | −3% |
| 2-4 | SmFeO$_3$/CoNiCrPtTa | 3000 | −3% |
| 2-5 | GdFeO$_3$/CoNiCrPtTa | 2900 | −3% |
| 2-6 | TbFeO$_3$/CoNiCrPtTa | 2900 | −3% |
| 2-7 | YFeO$_3$/CoNiCrPtTa | 3500 | −2% |
| 2-8 | CaFeO$_3$/CoNiCrPtTa | 2900 | −3% |
| 2-9 | BiFeO$_3$/CoNiCrPtTa | 2700 | −4% |

As shown in Table 2, in the media 2-1 to 2-9, since the thermal fluctuation during high-density recording is suppressed, the change in the reproduction output is significantly small.

Example 3

Magnetic recording media were produced by sputtering with CoCrPtB alloy, and sintered α-Fe$_2$O$_3$ and La$_{0.9}$Sr$_{0.1}$Fe$_{0.9}$Ni$_{0.1}$O$_3$ as targets. A vacuum chamber evacuated to 1×10$^{-8}$ Torr or less, and then an α-Fe$_2$O$_3$ film and La$_{0.9}$Sr$_{0.1}$Fe$_{0.9}$Ni$_{0.1}$O$_3$ film were formed on Si disk substrates by RF sputtering at an Ar gas pressure of about 0.8 mTorr and a substrate temperature of 300° C. for α-Fe$_2$O$_8$ and 600° C. for La$_{0.9}$Sr$_{0.1}$Fe$_{0.9}$Ni$_{0.1}$O$_3$. Then, a CoCrPtB magnetic film was formed by DC sputtering at room temperature as the substrate temperature. Thus, the recording medium having the structure shown in FIG. 1 was produced.

For comparison, a CoCrPtB single layer film was formed with a CoCrPtB target.

The thicknesses of the films were as follows: 50 nm for the α-Fe$_2$O$_3$ film and the La$_{0.9}$Sr$_{0.1}$Fe$_{0.9}$Ni$_{0.1}$O$_3$ film; and 15 nm for the CoCrPtB magnetic film. A carbon film having a thickness of 5 nm was formed on the surface of each of the produced media as a protective film.

The produced recording media were held at 250° C. for 1 hour while applying a magnetic field of about 5 kOe under a vacuum. Thereafter, the coercive force Hc was measured with a vibrating sample magnetometer at room temperature. Furthermore, signals were recorded on these media with 400 kFCI, using a magnetic head having a recording pole made of Fe$_{0.5}$Ni$_{0.5}$, and immediately after recording, the signals were reproduced with a GMR head. Then, 100 hours later, the same measurement was performed to examine a change in the reproduction output. The results are as follows.

TABLE 3

| No | Medium | Coercive force (Oe) | Change in reproduction output (%) |
|---|---|---|---|
| D | CoCrPtB | 2700 | −13% |
| 3-1 | α-Fe$_2$O$_3$/CoCrPtB | 3900 | −1% |
| 3-2 | La$_{0.9}$Sr$_{0.1}$Fe$_{0.9}$Ni$_{0.1}$O$_3$/CoCrPtB | 3800 | −1% |

Also in the media 3-1 and 3-2, the thermal fluctuation during high density recording was suppressed.

Example 4

Magnetic recording media were produced by sputtering with CoCrPtTa alloy, and sintered α-Fe$_2$O$_3$ and LaFeO$_3$ as targets. A vacuum chamber was evacuated to 1×10$^{-8}$ Torr or less, and then α-Fe$_2$O$_3$ films and LaFeO$_3$ films were formed on Si disk substrates by RF sputtering at an Ar gas pressure of about 0.8 mTorr and a substrate temperature of 300° C. for α-Fe$_2$O$_3$ and 600° C. for LaFeO$_3$. The thicknesses of the α-Fe$_2$O$_3$ film and the LaFeO$_3$ film were both 50 nm. Then, an exchanged coupled film of Co(3 nm)/Ru(0.7 nm)/CoCrPtTa(15 nm) or Co(3 nm)/Ru(0.7 nm)/Co(3 nm)/Ru(0.7 nm)/CoCrPtTa(15 nm) was formed by DC sputtering at room temperature as the substrate temperature (the thickness of the film is shown in the parentheses). Thus, the recording media having the structure shown in FIGS. 4 and 5 were produced.

For comparison, a CoCrPtTa single layer film having a thickness of 15 nm was formed by DC sputtering at room temperature as the substrate temperature. A carbon film having a thickness of 5 nm was formed on the surface of each of the produced media as a protective film.

The produced recording media were held at 250° C. for 1 hour while applying a magnetic field of about 5 kOe under a vacuum. Thereafter, signals were recorded on these media with 400 kFCI, using a magnetic head having a recording pole made of Co$_{0.67}$Fe$_{0.23}$Ni$_{0.1}$, and the signals were reproduced at 65° C. with a GMR head. Then, the media were held at 65° C., and 20 hours later, the same measurement was performed to examine a change in the reproduction output. For comparison, the same measurement was performed with respect to the medium No. 3-1 produced in Example 3. The results are as follows.

TABLE 4

| No | Medium | Change in reproduction output (%) |
|---|---|---|
| E | CoCrPtTa | −17% |
| 3-1 | α-Fe$_2$O$_3$/CoCrPtTa | −2% |
| 4-1 | α-Fe$_2$O$_3$/Co/Ru/CoCrPtTa | −2% |
| 4-2 | LaFeO$_3$/Co/Ru/CoCrPtTa | −2% |
| 4-3 | α-Fe$_2$O$_3$/Co/Ru/Co/Ru/CoCrPtTa | −1% |
| 4-4 | LaFeO$_3$/Co/Ru/Co/Ru/CoCrPtTa | −1% |

As shown in Table 4, when the Co/Ru/Co/Ru film was inserted, the heat stability was improved further.

Example 5

A magnetic recording medium was produced by sputtering with a CoPt alloy, and sintered $LaFeO_3$ and $SiO_2$ as targets. A vacuum chamber was evacuated to $1\times10^{-8}$ Torr or less, and then a $LaFeO_3$ film having a thickness of 50 nm was formed on a Si disk substrate by RF sputtering at an Ar gas pressure of about 0.8 mTorr and a substrate temperature of 600° C. Then, CoPt and $SiO_2$ were discharged simultaneously by RF sputtering at room temperature as the substrate temperature so as to form a $CoPt$—$SiO_2$ film having a thickness of 10 nm. Thus, the recording medium having the structure shown in FIG. 6 was produced.

For comparison, a $CoPt$—$SiO_2$ single layer film having a thickness of 10 nm was formed by discharging CoPt and $SiO_2$ simultaneously by RF sputtering at room temperature as the substrate temperature. A carbon film having a thickness of 5 nm was formed on the surface of each of the produced media as a protective film.

When observing the $CoPt$—$SiO_2$ film with a transmission electron microscope (TEM), CoPt having a grain size of about 10 nm was dispersed in the $SiO_2$ non-magnetic matrix in this film.

The produced recording media were held at 350° C. for 30 minutes while applying a magnetic field of about 10 kOe under a vacuum. Thereafter, the coercive force Hc of the medium was measured with a vibrating sample magnetometer at room temperature. Then, signals were recorded on these media with 400 kFCI, using a magnetic head having a recording pole made of $Co_{0.67}Fe_{0.23}Ni_{0.1}$, and immediately after recording, the signals were reproduced with a GMR head. Then, 100 hours later, the same measurement was performed to examine a change in the reproduction output. The results are as follows.

TABLE 5

| No | Medium | Coercive force (Oe) | Change in reproduction output (%) |
|---|---|---|---|
| F | $CoPt$—$SiO_2$ | 4200 | −8% |
| 5-1 | $LaFeO_3/CoPt$—$SiO_2$ | 5100 | −1% |

As shown in Table 5, the medium where the magnetic grains were dispersed in the non-magnetic matrix also suppressed thermal fluctuation.

Example 6

A magnetic recording medium was produced by sputtering with a FePt alloy, and $SrTiO_3$, $YFeO_3$ and $SiO_2$ as targets. A vacuum chamber was evacuated to $1\times10^{-8}$ Torr or less, and then a $SrTiO_3$ film was formed as an underlying film by RF sputtering on a Si disk substrate at an Ar gas pressure of about 0.8 mTorr and a substrate temperature of 600° C. Then, a $YFeO_3$ film having a thickness of 50 nm was formed by RF sputtering at a substrate temperature of 700° C. Then, FePt and $SiO_2$ were discharged simultaneously by RF sputtering at room temperature as the substrate temperature so as to form a $FePt$—$SiO_2$ film having a thickness of 10 nm. For comparison, a $FePt$—$SiO_2$ s film having a thickness of 10 nm was formed by discharging FePt and $SiO_2$ simultaneously by RF sputtering at room temperature as the substrate temperature on a Si disk substrate provided with a Cr underlying film. A carbon film having a thickness of 5 nm was formed on the surface of each of the produced media as a protective film.

When observing the $FePt$—$SiO_2$ film with a transmission electron microscope (TEM), FePt having a grain size of about 8 nm was dispersed in the $SiO_2$ non-magnetic matrix in this film.

The produced recording media were held at 500° C. for 30 minutes under a vacuum. Thereafter, the coercive force Hc of the media was measured with a vibrating sample magnetometer at room temperature. Then, signals were recorded on these media with 400 kFCI, using a magnetic head having a recording pole made of $Co_{0.67}Fe_{0.23}Ni_{0.1}$, and immediately after recording, the signals were reproduced with a GMR head. Then, 100 hours later, the same measurement was performed to examine a change in the reproduction output. The results are as follows.

TABLE 6

| No | Medium | Coercive force (Oe) | Change in reproduction output (%) |
|---|---|---|---|
| G | $Cr/FePt$—$SiO_2$ | 3900 | −8% |
| 6-1 | $SrTiO_3/YFeO_3/FePt$—$SiO_2$ | 4200 | −1% |

Also in this example, it was confirmed that the thermal fluctuation during high density recording can be improved significantly even if the coercive force Hc is the same level as that of conventional media.

The thermal fluctuation also can be reduced when the fine magnetic dots dispersed in the non-magnetic matrix can be produced by the following methods: a method of providing a monomolecular adsorption film on the surface of the magnetic grains and then chemically bonding them; and a method of subjecting an organic metal containing a magnetic element to a heat treatment to form self-aligned magnetic dots. This was confirmed with respect to films in which the non-magnetic matrix was constituted primarily by carbon, and the magnetic grains were FePt.

Example 7

The recording apparatus shown in FIG. 7 was produced with the media 2-1, 3-1, 4-3, 4-4, 5-1, or 6-1 produced in the above examples, and a thin film magnetic head. The magnetic head includes a recording head portion with a recording pole made of a CoFeNi based alloy film and a recording track width of 0.25 µm, and a reproducing head portion made of a PtMn based GMR film with a reproducing track width of 0.19 µm. For comparison, recording apparatuses were produced with the recording media C to G. With these recording apparatuses, recording and reproduction were performed with about 64 Gbp/in² (680 kbpi×94 ktpi). The results were that signal attenuation due to thermal fluctuation is significant for the recording apparatuses produced with the recording media C to G, and the obtained characteristics were impractical. The remaining media were compared with respect to the S/N ratio immediately after recording, measured based on the case using the medium F and the changes in the reproduction output after 100 hours at room temperature. Table 7 shows the results.

TABLE 7

| No | Medium | S/N (dB) | Change in reproduction output (%) |
|---|---|---|---|
| F | $CoPt$—$SiO_2$ | 0 | −18% |
| G | $Cr/FePt$—$SiO_2$ | 0 | −17% |
| 2-1 | $LaFeO_3/CoNiCrPtTa$ | 5 | −5% |
| 3-1 | $\alpha\text{-}Fe_2O_3/CoCrPtTa$ | 6 | −5% |
| 4-3 | $\alpha\text{-}Fe_2O_3/Co/Ru/Co/Ru/CoCrPtTa$ | 4 | −3% |
| 4-4 | $LaFeO_3/Co/Ru/Co/Ru/CoCrPtTa$ | 4 | −3% |

TABLE 7-continued

| No | Medium | S/N (dB) | Change in reproduction output (%) |
|---|---|---|---|
| 5-1 | LaFeO$_3$/CoPt—SiO$_2$ | 2 | −2% |
| 6-1 | SrTiO$_3$/YFeO$_3$/FePt—SiO$_2$ | 2 | −2% |

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic recording apparatus comprising a magnetic recording medium and a magnetic head for recording information on the medium, the magnetic recording medium comprising:

a magnetic film for signal recording; and a film comprising $M_2O_y$ that is magnetically exchange-coupled to the magnetic film, wherein y is a value satisfying $2.8<y<3.2$, wherein the element M includes an element A that is at least one selected from alkaline earth elements, Y, lanthanoids and Bi, and an element B that is at least one selected from Fe, Co and Ni, and t defined by the following equation satisfies $0.8<t<0.97$:

$$t=(Ra+Ro)/(\sqrt{2}\cdot(Rb+Ro))$$

where Ra is an ion radius of the element A, Rb is an ion radius of the element B, and Ro is an ion radius of an oxygen ion.

2. The magnetic recording apparatus according to claim 1, wherein the $M_2O_y$ has a perovskite structure.

3. The magnetic recording apparatus according to claim 1, wherein the element A is at least one selected from Y and lanthanoids.

4. The magnetic recording apparatus according to claim 1, wherein the element A is an alkaline earth element.

5. A magnetic recording apparatus comprising a magnetic recording medium and a magnetic head for recording information on the medium, the magnetic recording medium comprising:

a magnetic film for signal recording; and a film comprising $M_2O_y$ that is magnetically exchange-coupled to the magnetic film, wherein M is at least one element selected from Fe, Co, Ni, alkaline earth elements, Y, lanthanoids and Bi and includes at least one selected from Fe, Co and Ni as an essential element, and y is a value satisfying $2.8<y<3.2$ wherein the medium comprises a first non-magnetic film and a second magnetic film between a first magnetic film and the film comprises $M_2O_y$, the first magnetic film being the film for signal recording, wherein the first magnetic film and the second magnetic film are antiferromagnetically exchange-coupled via the first non-magnetic film.

6. The magnetic recording apparatus according to claim 5, wherein the second magnetic film is a laminate in which a third magnetic film, a second non-magnetic film and a fourth magnetic film are laminated in this order, and the third magnetic film and the fourth magnetic film are antiferromagnetically exchange-coupled.

7. A magnetic recording apparatus comprising a magnetic recording medium and a magnetic head for recording information on the medium, the magnetic recording medium comprising:

a magnetic film for signal recording; and a film comprising $M_2O_y$ that is magnetically exchange-coupled to the magnetic film, wherein M is at least one element selected from Fe, Co, Ni, alkaline earth elements, Y, lanthanoids and Bi and includes at least one selected from Fe, Co and Ni as an essential element, and y is a value satisfying $2.8<y<3.2$, wherein the magnetic film for signal recording comprises a non-magnetic matrix and a plurality of magnetic grains having a diameter of not more than 10 nm arranged in the matrix.

8. The magnetic recording apparatus according to claim 5, wherein the film comprising $M_2O_y$ contains $\geq 50\%$ by weight $M_2O_y$.

9. The magnetic recording apparatus according to any of claims 1, 5, or 7, wherein an absolute value of a shift magnetic field s defined by the following equation is not more than 200 Oe:

$$s=(H_1+H_2)/2$$

where $H_1$ and $H_2$ are magnetic fields in which a magnetization is 0 (M=0) in a magnetization—magnetic field curve (M—H curve) showing a relationship between a magnetic field (H) and a magnetization (M) of the magnetic recording medium.

10. The magnetic recording apparatus according to claim 9, wherein an absolute value of the shift magnetic field s is not more than 100 Oe.

* * * * *